United States Patent [19]

Satoh et al.

[11] Patent Number: 4,948,091

[45] Date of Patent: Aug. 14, 1990

[54] MOTOR-OPERATED VALVE

[75] Inventors: Ikumi Satoh; Jun Nakano; Riichiroh Harada; Tatsuhiko Koba, all of Iruma; Yuichi Fujita, Ichikawa; Kazumi Shima, Sakura, all of Japan

[73] Assignees: Kabushiki Kaisha Yaskawa Denki Seisakusho, Fukuoka; Toyo Engineering Corporation, Tokyo, both of Japan

[21] Appl. No.: 481,049

[22] Filed: Feb. 16, 1990

[30] Foreign Application Priority Data

Feb. 17, 1989 [JP] Japan .................................. 1-39125
Dec. 22, 1989 [JP] Japan .................................. 1-33890

[51] Int. Cl.$^5$ .......................................... F16K 31/08
[52] U.S. Cl. ................... 251/65; 251/129.11; 251/129.2; 251/129.21; 251/267; 251/229
[58] Field of Search ................ 74/89.15, 424.8 VA; 251/65, 129.11, 129.2, 129.21, 229, 266, 267; 137/625.3, 625.31, 625.33

[56] References Cited

U.S. PATENT DOCUMENTS

| | | | |
|---|---|---|---|
| 2,533,491 | 12/1950 | McMahon et al. | 251/65 |
| 2,589,188 | 3/1952 | DeCraene et al. | 251/65 |
| 3,355,140 | 11/1967 | Andersen | 251/65 |
| 3,977,436 | 8/1976 | Larner | 251/65 |
| 4,274,444 | 6/1981 | Ruyak | 251/65 |
| 4,412,517 | 11/1983 | Kobashi et al. | 251/129.11 |
| 4,452,423 | 6/1984 | Beblavi et al. | 251/129.11 |
| 4,650,156 | 3/1987 | Kawahira | 251/129.11 |
| 4,664,355 | 5/1987 | Kubach | 251/65 |
| 4,723,753 | 2/1988 | Torimoto | 251/129.2 |
| 4,789,132 | 12/1988 | Fujita et al. | 251/129.11 |

Primary Examiner—George L. Walton
Attorney, Agent, or Firm—Beveridge, DeGrandi & Weilacher

[57] ABSTRACT

A motor-operated valve is constructed such that a stator is provided outside of a nonmagnetic tubular member allowing flow of a fluid, with stator coils wound around a plurality of magnetic poles, and a plurality of permanent magnets are secured to an operating surface of each magnetic pole. The permanent magnets are magnetized into a number of pole-pairs arranged at a constant pitch. A rotor is rotatably supported inside of the tubular member. A number of induction teeth are formed along the circumference of the rotor at a pitch equal to the pitch of the pole-pairs of the permanent magnets, and the total number of the induction teeth is so selected that it is different from the total number of the pole-pairs of the permanent magnets by an amount equal to an even number. A mechanism including a rotation-preventing means is also provided in the rotor for converting the rotating movement of the rotor into a linear movement of a valve member.

17 Claims, 8 Drawing Sheets

MOTOR-OPERATED VALVE

BACKGROUND OF THE INVENTION

This invention relates to a motor operated valve of a type wherein a rotor provided in a tubular member is rotated by a stator provided outside of the tubular member, and a valve member is operated by the rotation of the rotor.

The known valves are disclosed, for instance, in published U.S. Pat. Nos. 4,452,423 and 4,789,132. The disclosed valve comprises a stator which generates a rotating magnetic field around the wall of a tubular member, and a rotor which is supported rotatably in the tubular member in opposition to the stator and a screw and a nut. The rotating movement of the rotor is converted into a linear movement of a valve member by a screw mechanism. The aforementioned stator is constructed in the form of a magnetic collar having permanent magnets and freely slidable around the tubular member, or in the form including ordinary stator coils. On the other hand, the rotor is constructed to include permanent magnets or a magnetic member adapted to create eddy current.

In a case where the stator is constructed in the form of a magnetic collar, a mechanism for slidably rotating the collar around the tubular member is required, while in a case where the stator is constructed to include ordinary stator coils, the outer measurement thereof will be increased when the magnetomotive force of the coils is desired to be increased. Furthermore, the number of magnetic poles is restricted by the shape and size of the coils, so that a precision adjustment of the valve member is made difficult. In addition, when the permanent magnets are used in the rotor, the magnetic property of the magnets tends to be deteriorated by the high temperature of the fluid, or a joining strength between the magnets and the supporting member, which strength also tends to be weakened similarly so that the magnets will be easily dropped out of the rotor.

SUMMARY OF THE INVENTION

An object of this invention is to provide a motor-operated valve wherein the above described difficulties of the conventional constructions are substantially eliminated.

Another object of this invention is to provide a motor-operated valve which is simple in construction and economical in production and high in reliability.

Still another object of the invention is to provide a motor-operated valve which can be operated at high precision.

These and other objects of the invention can be achieved by a motor-operated valve wherein a stator is provided outside of a nonmagnetic tubular member, a rotor is rotatably supported by bearings within the tubular member in opposition to the stator, and a mechanism including a rotation-preventing means is provided for converting the rotating movement of the rotor into a linear movement of an operating shaft, so that a valve member secured to the operating shaft is moved toward or away from a valve seat; characterized in that the stator comprises a plurality of magnetic poles with stator coils concentratedly wound therearound, moreover a plurality of permanent magnets secured to an arcuate surface of each magnetic pole, the permanent magnets being magnetized to provide a number of pole pairs arranged at a constant pitch, then multiple pole-pairs being configured onto the magnetic poles. The rotor comprises a boss, a rim and an outer annular portion, a number of induction teeth being formed along the circumference of the outer annular portion at a pitch equal to the pitch of the pole-pairs of the permanent magnets such that the total number of the induction teeth is selected to be different from the total number of the pole-pairs of the permanent magnets by an amount equal to an even number.

The mechanism for converting the rotating movement of the rotor into a linear movement of a valve operating shaft is preferably constructed in the form of a screw-thread engagement of the valve operating shaft, together with the rotation-preventing means which guides linearly the valve member regardless of the rotation of the rotor by key way and key as like.

The bearings for rotatably supporting the rotor installed into the tubular member is preferably provided in various positions suitable for the usage.

Various types of valves such as a globe valve, angular valve, plug valve and else may be utilized according to the embodiments of the present invention.

DESCRIPTION OF THE PREFERRED EMBODIMENTS

Figure 1:
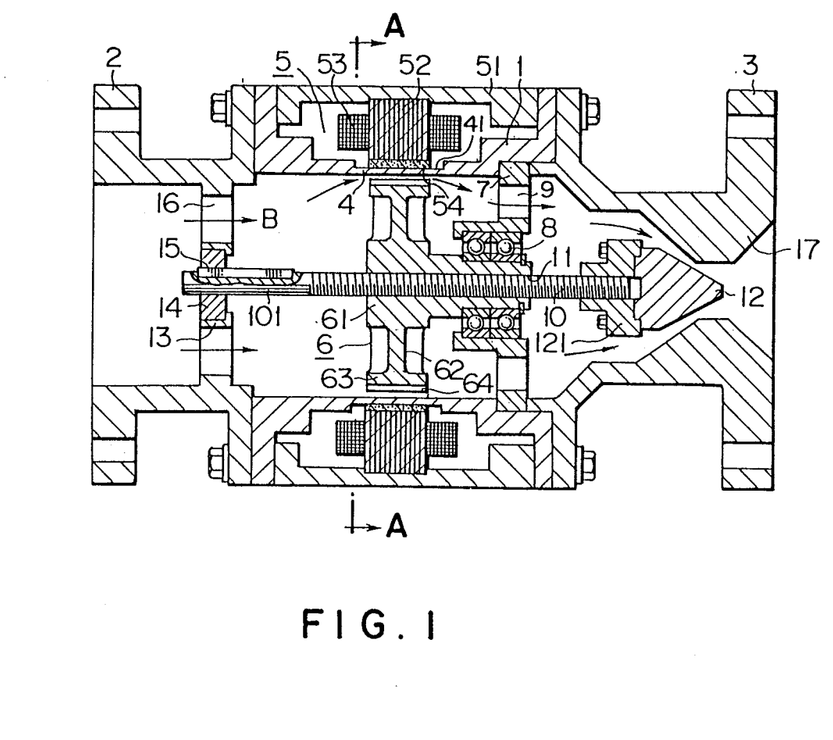
FIG. 1 is a longitudinal sectional view showing a first embodiment of the invention.
Figure 2:
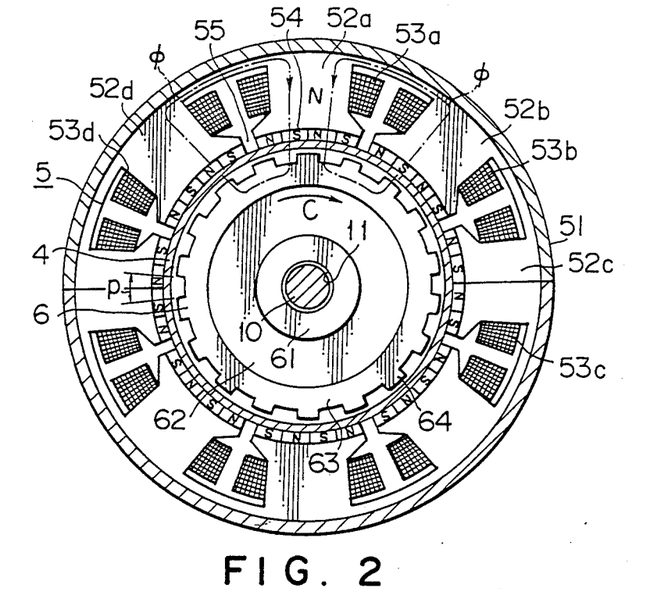
FIG. 2 is a sectional view sectioned along the line A-A in FIG. 1.

The invention will now be described with reference to the accompanying drawings. FIGS. 1 and 2 illustrate a first embodiment of this invention wherein numeral 1 designates a tubular member made of a nonmagnetic material and forming one part of a fluid passage. Both ends of the tubular member 1 are connected with flange members 2 and 3 which are to be connected with adjacent sections of a pipe line (not shown). The tubular member 1 has a thinned portion 4, and outside of the thinned portion 4 is radially provided a stator 5 and inside of this thinned portion 4 provided a rotor 6 of a valve driving motor. Numeral 7 designates a bracket axially provided inside of the tubular member 1, numeral 8 designates bearings provided in the bracket 7 for supporting the rotor 6 on one side thereof in a cantilever manner, and numeral 9 designates passage holes of the fluid provided through the bracket 7 for allowing the fluid to flow inside of the tubular member 1. A valve operating shaft 10 partly threaded with a male screw is inserted into a central hole 11 of the rotor 6 in a thread engagement (or meshing) with a female screw formed internally of the central hole 11. A valve member 12 is secured to a valve support 121 which in turn is secured to an end of the valve operating shaft 10 in another thread engagement for fixing. A not threaded portion 101 at the other end of the valve operating shaft 10 is supported by a guide plate 14 such that the rotation of the valve operating shaft 10 is prohibited by a sliding key 15 secured to the portion 101 of the valve operating shaft 10. The guide plate 14 is supported by a supporting member 13 formed integrally with the flange member 2. Numeral 16 designates passage holes of the fluid, numeral 17 designates a valve seat provided in the flange member 3, and an arrow-mark B indicates the flow of fluid.

Of course, the fluid may be flowed through the valve in a direction reverse to the direction of the arrow in the drawing in this and other embodiments.

The stator 5 is encased in a frame 51 secured to the tubular member 1, and comprises a laminated iron core 52 separable into two pieces. The iron core 52 has a plurality of (eight in the shown example) salient poles 52a, 52b, 52c ... provided around a stator securing recess 41 formed in the tubular member 1. At the time of assembling, the two pieces of the iron core are separately inserted into the stator securing recess 41. A coil 53 is concentratedly wound around each salient pole, so that the poles 52a, 52b, ... are magnetized into alternate polarities. A number of permanent magnets 54 magnetized into alternate polarities are sticked to the entire arcuate surface of each salient pole of the stator core 52, so that the pitch P of the alternately magnetized poles of the permanent magnet 54 is made equal to a length obtained by equally dividing the arc of the surface of the salient pole. On the other hand, a gap 55 provided between two adjacent salient poles is selected to be different from the pole pitch P. More specifically the gap is made equal to $P \times (K - \frac{1}{2})$ wherein K represents a positive integer larger than 1. In an example shown in FIG. 2, the gap 55 is selected to $(\frac{1}{2})P$.

The rotor 6 of the above described embodiment comprises a boss 61, a rim 62 and an outer annular portion 63 made of a ferromagnetic material, which are combined integrally. On the peripheral surface of the annular portion 63 are formed a plurality of induction teeth 64 at a pitch equal to the pole pitch P of the permanent magnets 54. Assuming that the number of pole pairs of the permanent magnets 54 is represented by Np, and the number of the induction teeth 64 is represented by Nt, a relation as follows is maintained between the two numbers Np and Nt:

$|Np - Nt| = 2K$ wherein K is a positive integer larger than 1.

As described herebefore, the valve seat 17 is provided in the flange member 3, and at the time of assembling, the rotor 6, the valve operating shaft 10 coupled with the valve member 12, as well as the bracket 7 and bearings 8 are assembled together and inserted in the tubular member 1. After the insertion, the flange members 2 and 3 are secured on both sides of the tubular member 1.

Figure 3:
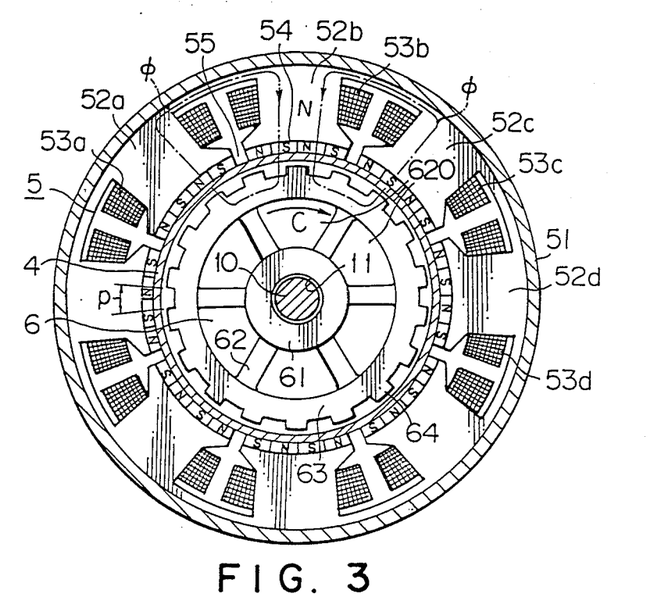
FIG. 3 is a sectional view similar to FIG. 2 showing a second embodiment of the invention.

Furthermore, it would be preferable to provide a plurality of passage holes 620 through the rim 62 as shown in FIG. 3 for facilitating the flow of fluid through the rotor 1.

The operation of the first embodiment will now be described.

Firstly, a salient pole 52a wound by the concentrate coil 53a is excited into N pole, the poles 52 of the stator 5 and the induction teeth 64 of the rotor 6 are held in a relation shown in FIG. 2, where a magnetic field $\phi$ produced by the excitation is superposed on the magnetic fields produced by the permanent magnets sticked to the surface of the salient pole 52b so that the magnetic fields in N polarized portions of the permanent magnets 54 are enhanced while the magnetic fields in S polarized portions of the same are reduced. On the salient poles 52a and 52c acting as return paths, the magnetic fields in S polarized portions of the permanent magnets 54 sticked to these salient poles 52a and 52c are enhanced while the magnetic fields N polarized portions of the same are reduced.

Secondly, a salient pole 52b wound by the coil 53b is changed the excitation into N pole.

Then the superposed magnetic fields in pitch length of the permanent magnet, as a result, the induction teeth 64 on the rotor 6 are attracted by the polarized portions of the permanent magnets thus enhanced, and the rotor 6 is rotated in the arrowed direction C by an angle corresponding to $(\frac{1}{2})P$. Samely, the salient pole 52c is excited into N pole, the induction teeth 64 on the rotor 6 are attracted by the polarized portions of the permanent magnets as described above, and the rotor 6 is further rotated in the arrow-marked direction C by the same angle of $(\frac{1}{2})P$, as a result, the motor operate as a pulse motor.

According to one rotation of the rotor 6, the valve operating shaft 10 in screw-thread engagement with the rotor 6 is shifted axially by an amount corresponding to one pitch of the screw thread, thereafter the rotation of the valve operating shaft 10 converted to linear movement by the guide plate 14 and sliding key 15, so that the opening between the valve member 12 and the valve seat 17 is adjusted as desired. Then the fluid flows through the passage holes 16, and clearance between inductor teeth 64, the passage holes 9 and the opening between the valve member 12 and the valve seat 17.

In a case where a ball screw is utilized in the screw threaded portion, the conversion of the movement can be executed smoothly, and the efficiency thereof can be improved.

FIG. 3 illustrates a second embodiment of the invention, wherein a plurality of passage holes 620 are provided through the rim 62 as described hereinbefore for facilitating the flow of a fluid flow B through the rotor 6.

Figure 4:
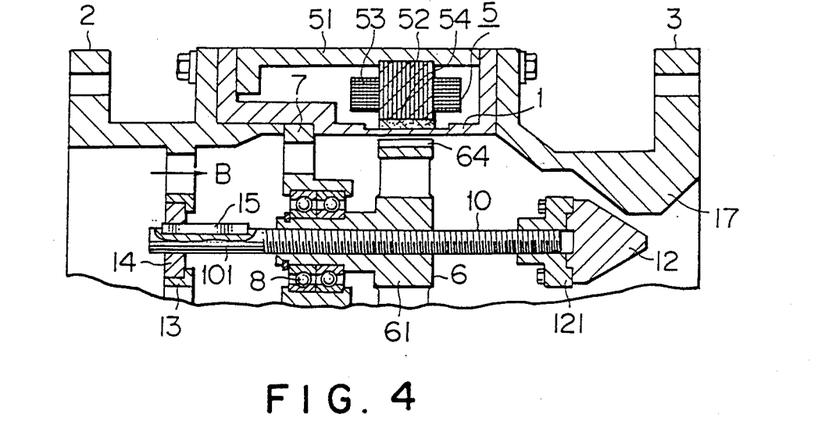
FIG. 4 is a longitudinal sectional view with a lower part omitted, showing a third embodiment of the invention.

FIG. 4 illustrates a third embodiment of the present invention, in which the bearings 8 are provided on a side of the valve operating shaft 10 far from the valve member 12. This embodiment is adapted to a case where the stroke of the linear movement of the valve operating shaft 10 is comparatively long. In this embodiment, the sliding key 15 for prohibiting rotation of the valve operating shaft 10 may be provided between the rotor 6 and the valve member 12.

Figure 5:
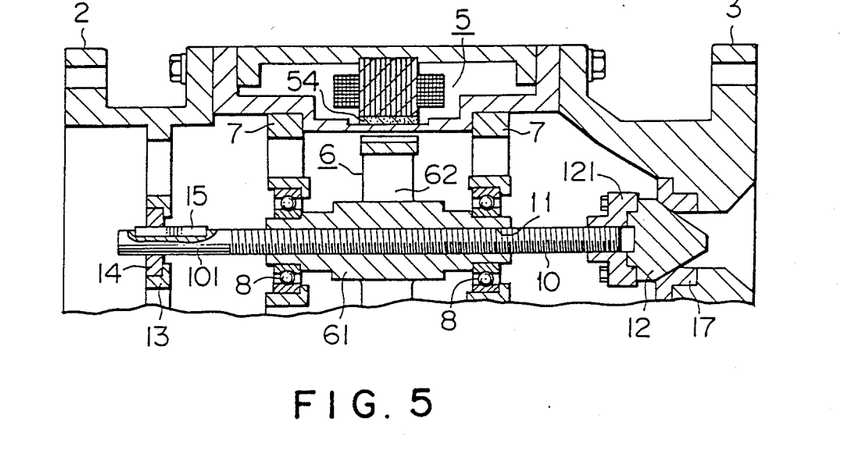
FIG. 5 is a longitudinal sectional view with a lower part thereof omitted, showing a fourth embodiment of the invention.

FIG. 5 illustrates a fourth embodiment of this invention wherein the bearings 8 are provided on both sides of the rotor 6.

Figure 6:
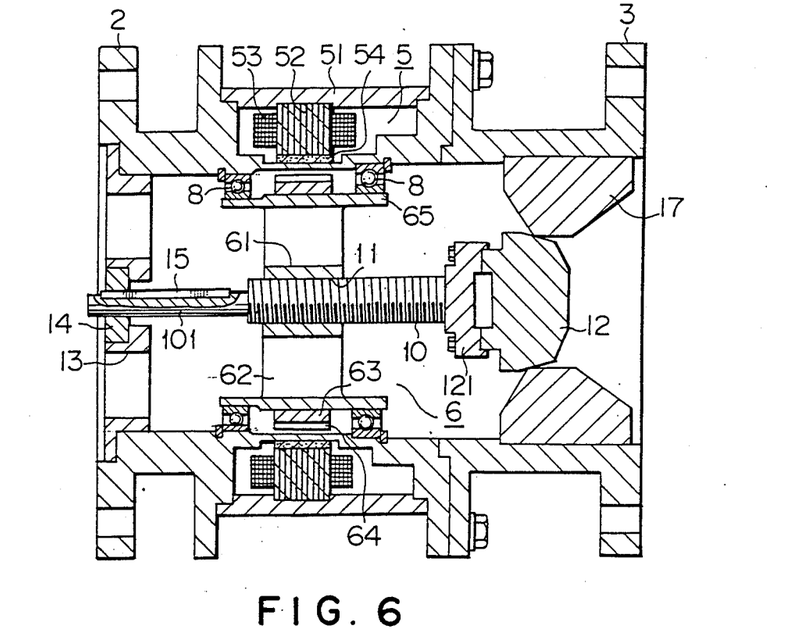
FIG. 6 is a longitudinal sectional view showing a fifth embodiment of the invention.

FIG. 6 illustrates a fifth embodiment wherein the valve operating shaft 10 of the valve member 12 is supported in a stable manner. In this embodiment, the end of both the outer annular portion 63 of the rotor 6 is axially extended so as to provide supporting portions 65, and the bearings 8 are supported between the supporting portions 65 and the tubular member 1.

Figure 7:
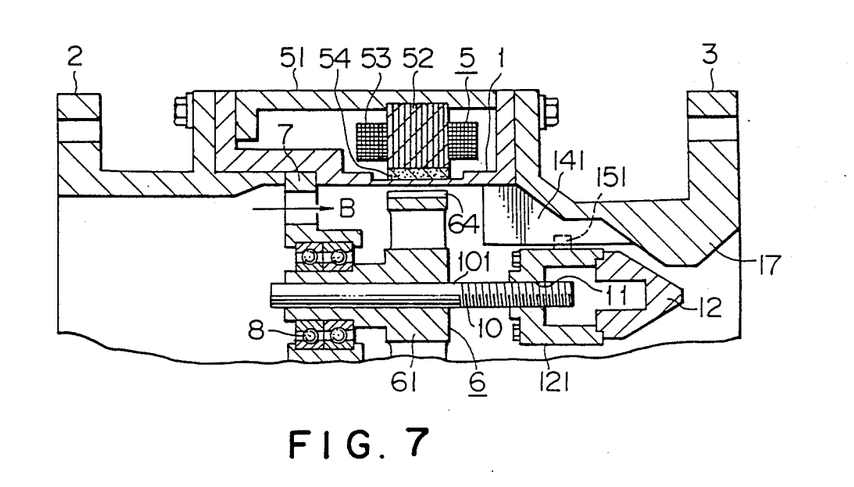
FIG. 7 is a longitudinal sectional view showing a sixth embodiment of the invention.

FIG. 7 illustrates a sixth embodiment of the invention. According to this embodiment, a not-threaded portion 101 of the valve operating shaft 10 is fixedly inserted into a central hole of the rotor 6, while a partially screw-threaded portion of the operating shaft 10 is extended toward the valve member 12. On the other hand, a female screw thread hole 11 is provided through the valve supporting member 121, and the aforementioned screw-threaded portion of the valve operating shaft 10 is inserted in thread engagement into the female screw threaded hole 11 of the valve supporting member 121. Numeral 151 designates the sliding keys projecting from one part of the outer surface of the valve supporting member 121. The sliding keys 151 are made slidable along a guide groove formed between two guide plates 141 that are extend axially in parallel and are secured to the valve seat member 17, so that the rotation of the valve supporting member 121 is thereby prohibited. As a consequence, the rotating movement of the rotor 6 and the operating shaft 10 is converted into a linear movement of the valve supporting member 121 and the valve member 12, and the opening between the valve member 12 and the valve seat 17 can be adjusted as desired.

Figure 8:
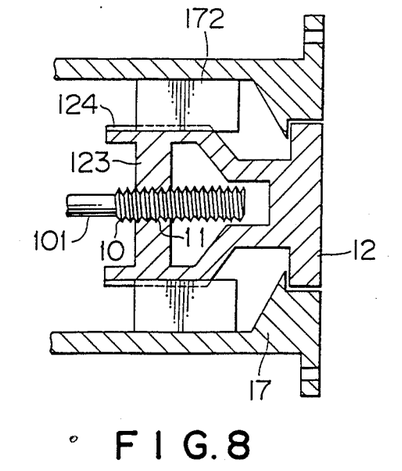
FIG. 8 is a sectional view showing a modification of a valve member and valve seat constituting a seventh embodiment of the invention.

FIG. 8 illustrates a seventh embodiment of this invention held in a closed state. When the valve member 12 is shifted forwardly apart from the valve seat 17, the valve is brought into the opened state. More specifically, a hollow space having an inner diameter much larger than the outer diameter of an end plate 123 of the valve 12 is provided in the valve seat member 17, while a female screw threaded hole 11 is provided in the end plate 123 provided on a motor side of the valve member 12. A screw threaded portion of the operating shaft 10 is inserted in thread engagement into the female screw-threaded hole 11. A plurality of guide plates 172 extending axially are secured to the internal surface of the hollow space formed in the valve seat member 17, while a corresponding number of guide grooves 124 engageable with the guide plates 172 are formed on the outer surface of the valve member 12. As a consequence, the valve member 12 is moved axially under the guide of the guide plates 172 and the guide grooves 124 engaging with each other, so that the opening of the valve is adjusted as desired.

Figure 9:
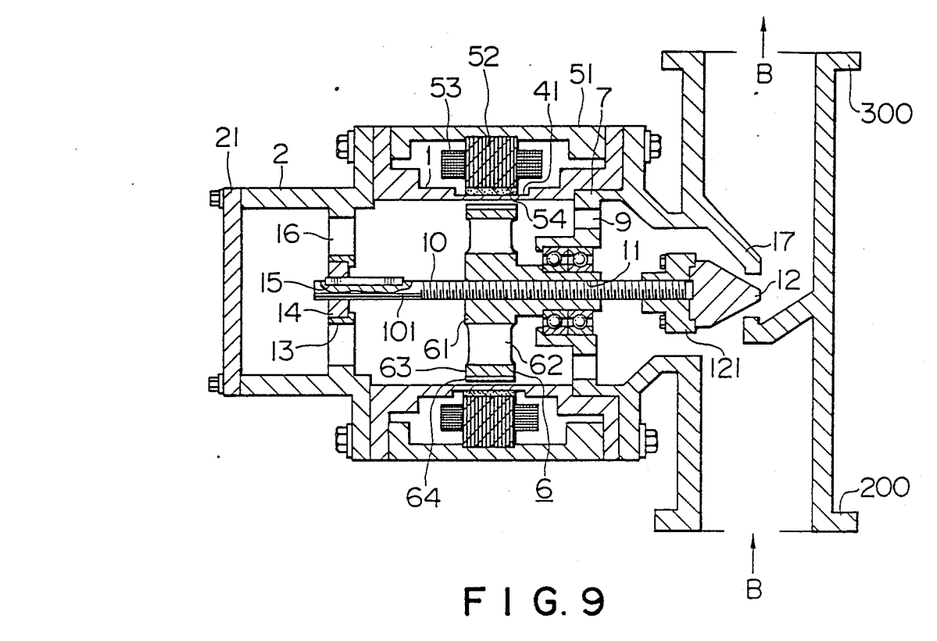
FIG. 9 is a longitudinal sectional view showing an eighth embodiment of the invention.

FIG. 9 illustrates an eighth embodiment of this invention wherein the invention is applied to a kind of a needle type valve having an inlet port and an outlet port provided on the opposite ends thereof in the form of a straight tube which extends perpendicularly to the moving direction of the valve member 12.

Heretofore, the motor being operable as an actuator for this kind of valve has been provided outside of the fluid containing portion, with a sliding type seal such as gland packing or a flexible seal such as bellows (nonsliding type) used between the fluid containing portion and the actuator. However, the slide seal causes a large frictional force, thus consuming a considerable amount of energy for actuating the valve, and it has been difficult to eliminate fluid leakage. Although the bellows consumes no recognizable amount of energy, it accompanies a difficulty in its durability against the repeated expansion and compression. The embodiment shown in FIG. 9 is provided to overcome the above described drawbacks.

According to this embodiment, the construction of the actuator is held substantially equal to that of the embodiment shown in FIG. 1. However, the actuator (or motor) is disposed at right angles to the flowing direction B of the fluid (in the shown example, from down to upward). Although the fluid somewhat flows around the rotor 6 within the tubular member 1, it constitutes no main part of flow even in the case of opened valve. Numerals 200 and 300 designate flanges formed at the ends of the tubular valve body, and numeral 21 designates a lid plate provided on the opposite side of the actuator for preventing leakage of the fluid. It is apparent that the invention of this embodiment can otherwise be applied to other types of valve such as globe valves.

Figure 10:
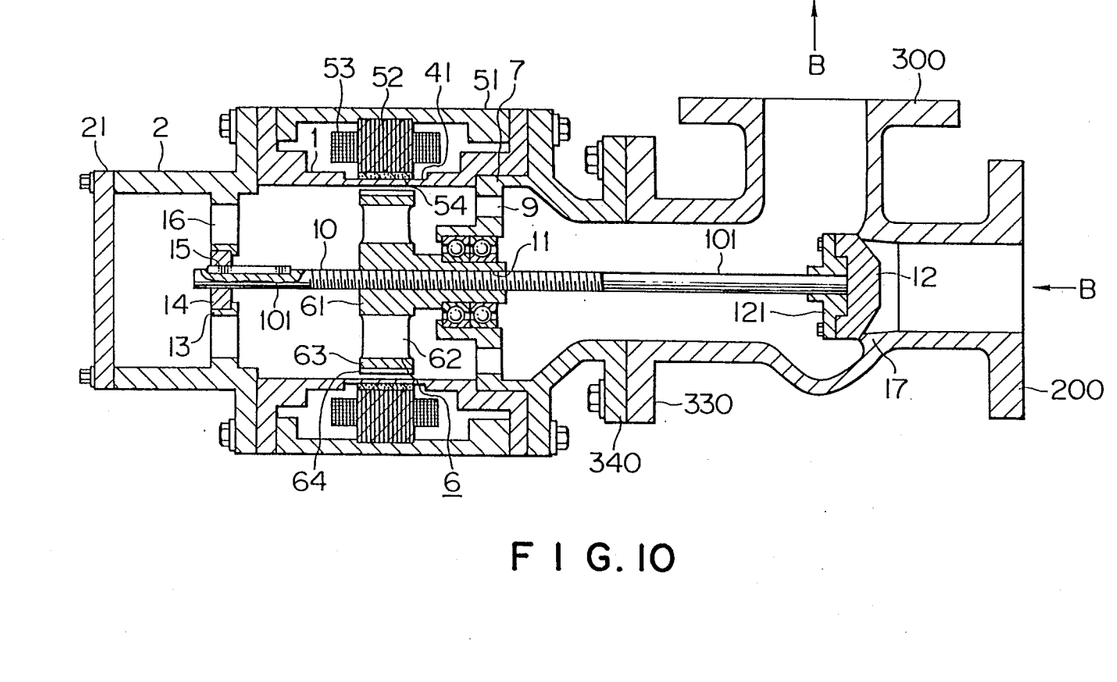
FIG. 10 is a longitudinal sectional view showing a ninth embodiment of this invention wherein the invention is applied to an angular valve.

FIG. 10 illustrates a ninth embodiment of this invention, wherein the actuator is coupled to an angular valve. In this embodiment wherein the flow path between the inlet and outlet of the valve is bent as shown in FIG. 10, the constructions of the valve member and the valve seat inclusive of the valve operating shaft 10 (or the shaft portion 101) as shown in FIGS. 1, 4, 5, 6 and 9 would be advantageous. However, these may otherwise be constructed such that the operating shaft 10 includes a screw-threaded portion 101 engaging with the valve member 12, and a rotation preventing means inclusive of sliding keys 151 and guide plates 141 are provided on the valve supporting member 121 and the valve seat 17 as shown in FIG. 7.

Alike the embodiments shown in FIGS. 1-8, the embodiments shown in FIGS. 9 and 10 permit to confine the fluid in an air-tight or a liquid tight manner without employing the sliding seal or flexible seal. Furthermore, the embodiments can reduce the possibility of depositing foreign particles or powdery materials contained in the fluid onto the screw-threaded portion or between the rotor 6 and the tubular member 1.

When it is required, a filter may be provided on a side of the bracket 7 facing the valve seat 17 for preventing the deposition.

Figure 11:
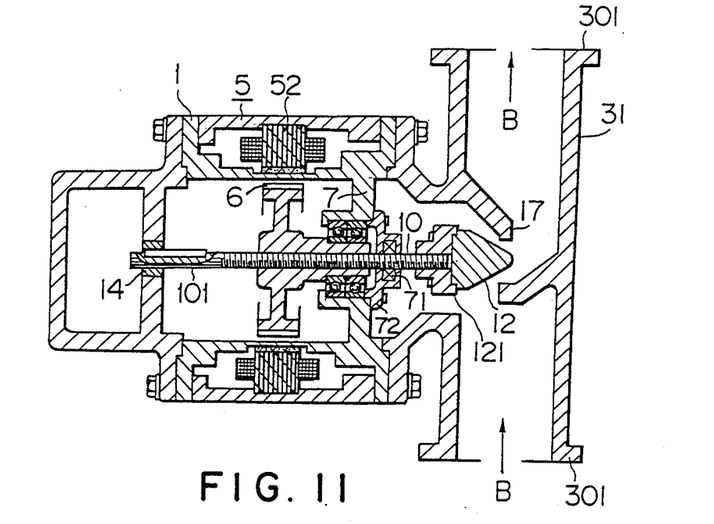
FIG. 11 is a longitudinal sectional view showing a tenth embodiment wherein the actuator in FIG. 9 is changed into a different type.
Figure 12:
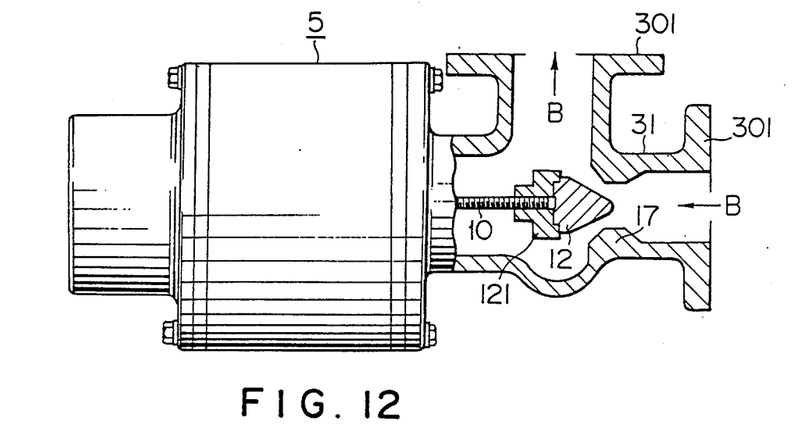
FIG. 12 is a profile view, partly sectioned, showing an eleventh embodiment wherein the actuator used in FIG. 11 is applied to an angular valve.

The embodiments shown in FIGS. 11 and 12 are proposed for eliminating the above described difficulty completely.

FIG. 11 illustrates a 10th embodiment which is similar to the embodiment shown in FIG. 9 except that the bracket 7 secured to the valve side of the tubular member 1 is made liquid tight, and a seal cover 72 provided with a sealing mechanism (or a seal) 71 is secured to the valve side surface of the bracket 7 for sealing an annular space formed between the operating shaft 10 and the seal cover 72.

FIG. 12 illustrates a 11th embodiment which is similar to the 9th embodiment shown in FIG. 10 except that the construction of the actuator is varied from that of the 9th embodiment. More specifically, the bracket 7 of the actuator is made liquid-tight and a seal cover 72 including a seal mechanism (or seal) 71 is secured to the valve side surface of the bracket 7 as in the case of FIG. 11, although such a detail is omitted in FIG. 12 for simplifying the drawing. The aforementioned seal mechanism 71 may be of a flexible type such as bellows instead of the sliding type.

Figure 13A:
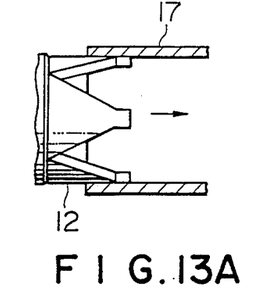
FIGS. 13(a) to 13(e) are partial sectional views showing various types of valves constituting twelfth to sixteenth embodiments of this invention.

FIGS. 13(a) through 13(e) are sectional views showing important parts of the 12th to 16th embodiments of this invention. More specifically, FIG. 13(a) illustrates a valve member 12 and a valve seat 17 constituting the 12th embodiment. When the cylindrical valve member 12 is moved leftward from the shown position, a plurality of V-shaped openings formed between the valve member 12 and the valve seat 17 are enlarged so as to increase the amount of the fluid passing therethrough. That is, the opening of the valve can be adjusted by shifting the valve member 12 in axial directions relative to the valve seat 17. The valve member of this type is described as "V-port plug valve member", for instance, in "Perry's Chemical Engineers' Handbook" 6th edition, McGraw-Hill Book Company, 1984, pages 22-82.

Figure 13B:
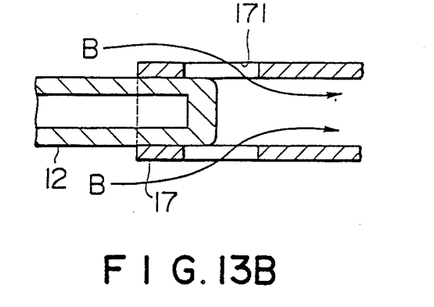

FIG. 13(b) illustrates a 13th embodiment of this invention, wherein a plug-shaped valve member 12 is inserted into a cage-shaped valve seat 17 with a slit 171 formed on both sides of the valve seat. In this embodiment, the opening of the valve can be adjusted by shifting the valve member 12 axially as in the case of FIG. 13(a). Various types of the plug-shaped valve member are illustrated in FIGS. 22-125 at pages 22-84 of the above described document.

Figure 13C:
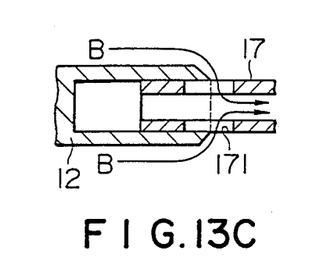

FIG. 13(c) illustrates a 14th embodiment of this invention, wherein the valve member 12 is formed into a hollow cylindrical shape opening toward one direction (in the shown example, opening rightwardly), while the valve seat 17 is formed into cage shape with a plurality of slits 171 formed around the valve seat 17. The valve seat 17 is inserted into the hollow cylindrical valve member 12 such that the two members 12 and 17 are slidingly engageable. When the cylindrical valve member 12 is shifted leftward relative to the valve seat 17, the slits 171 are opened thus permitting flow of the fluid.

Figure 13D:
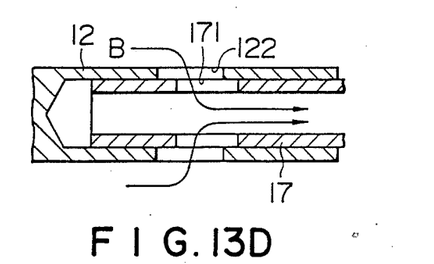

FIG. 13(d) illustrates a 15th embodiment similar to the 14th embodiment excepting that slits 122 are also formed through the valve member 12 of the 14th embodiment. The valve is brought into a fully opened condition when the slits 122 coincide with the slits 171 of the valve seat 17, and the opening of the valve can be adjusted by adjusting the overlapping degree of the slits 122 and 171 formed through the two members 12 and 17. In this embodiment, the axial positions of the slits 122 and 171 may be so selected that the valve is brought into opened state when the valve member 12 is shifted rightwardly.

Figure 13E:
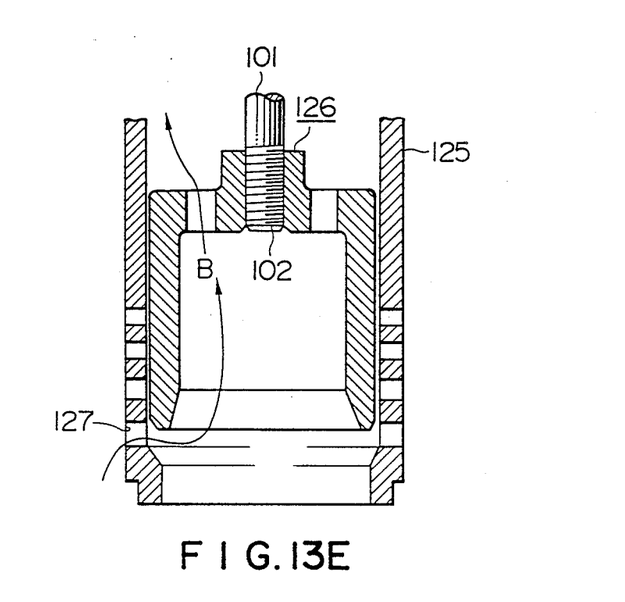

FIG. 13(e) illustrates a 16th embodiment wherein a part of the operating shaft 10 extending outwardly from the nonthreaded portion 101 is formed into a thread-engaging portion 102 engageable with the female screw thread of a cup-shaped valve member 126. The valve member 126 is slidably inserted in a cage type valve seat 125 of a cylindrical configuration with a number of holes 127 provided through the circumferential wall of the valve seat 125. When the valve member 126 is shifted axially upwardly and downwardly as viewed in FIG. 13(e), the holes 127 are opened or closed, and a flowing amount of the fluid B is thereby controlled.

Although in the embodiments shown in FIGS. 13(b) through 13(e), slidably engaging cylindrical surfaces of the valve member and the valve seat are utilized so as to open or close the holes or slits provided through the valve seat, one or two sets each comprising a planar valve member and a planar valve seat slidingly engageable with each other and a seat of holes or slits formed through the planar valve member may also be used instead of the cylindrical valve member and the cylindrical valve seat. It is apparent that the aforementioned planar constructions of the valve member and valve seat would also be illustrated in sectional views substantially equal to FIGS. 13(b) through 13(e).

The above described invention can be applied to all of the valves whose opening and closing operations are accomplished by shifting the valve member 12 axially and varying the position thereof relative to the valve seat.

The invention exhibits following advantageous features.

Owing to the permanent magnets provided on the operating surface of each magnetic pole, the actuator can be operated as a stepping motor when the stator coils are excited sequentially. As a consequence, the rotation of the rotor can be controlled stepwise, and the opening of the valve can be adjusted precisely.

The magnetic fields produced by the permanent magnets is superposed onto the magnetic field produced by the magnetic poles, so that the exciting current required for the stator coils is substantially reduced. Since the permanent magnets are provided outside of the passage of the fluid, adverse effects caused by the fluid of a high temperature can be eliminated completely.

Since the construction of the rotor is simplified by the invention, not only the flowing passage formed through the rotor can be enlarged and the flow-resistance of the passage can be reduced, but also the heat-resisting and corrosion resisting treatments can be easily facilitated. For instance, a corrosion-resisting coating or surfacing can be formed on the rotor by a working which accompanies heating such as a thermal spraying.

Furthermore, since the valve is operated electrically, an air compressor and other associated equipments such as piping ordinarily adopted are not required, so that the adverse effects thereby caused can be eliminated. Since the stator does not project much from the tubular member, the size of the motor-operated valve can be reduced. In a case where a construction confining fluid (i.e. the rotor being dipped in the fluid) is employed, leakage of the fluid can be prevented without requiring a sliding seal or a flexible seal, so that the energy loss caused by these seals can be eliminated. When the construction of this invention is compared with an ordinary construction having a high-speed motor and a speed-reduction mechanism, it is apparent that the construction of this invention is far more advantageous than the ordinary construction in the points of response speed, precision, occupied space, required weight, and easiness of handling.

WHAT IS CLAIMED IS

1. A motor-operated valve comprising a stator provided outside of a nonmagnetic tubular member, with stator coils concentratedly wound around a plurality of magnetic poles and a plurality of permanent magnets secured to an arcuate surface of each magnetic pole, said permanent magnets being magnetized into a number of pole-pairs arranged at a constant pitch, a rotor rotatably supported in said tubular member, said rotor comprising an outer annular portion, a rim portion and a boss portion, a number of induction teeth being formed along the circumference of said outer annular portion at a pitch equal to the pitch of the pole-pairs of the permanent magnets such that the total number of said teeth is selected to be different from the total number of the pole-pairs of the permanent magnets by an amount equal to an even number, a threaded valve operating shaft securing a valve member at an end engaging to said rotor, and a mechanism including a rotation-preventing means provided in said valve with said rotor for converting the rotating movement of said rotor into a linear movement moving a valve member provided at an end of an operating shaft.

2. The motor-operated valve according to claim 1 wherein a female screw thread is formed internally of said boss, and a male screw thread meshing with said female thread is formed on said valve operating shaft operating said valve member.

3. The motor-operated valve according to claim 2 wherein axial passage holes are formed through said rim of said rotor.

4. The motor-operated valve according to claim 2 wherein bearings rotatably supporting said rotor are provided on both sides of said rotor.

5. The motor-operated valve according to claim 5 wherein the bearings rotatably supporting said rotor are provided on a part of said boss extending toward or away from said valve member.

6. The motor-operated valve according to claim 2 wherein bearings rotatably supporting said rotor are provided on one side of said rotor adjacent to or remote from the valve member.

7. The motor-operated valve according to claim 2 wherein said bearings rotatably supporting said rotor are provided between said outer annular portion of the rotor and the internal surface of said tubular member.

8. The motor-operated valve according to claim 2 wherein said rotation preventing means includes a groove formed to extend axially in an end of said valve operating shaft adjacent or far from the valve member, and a key inserted in said groove.

9. The motor-operated valve according to claim 2 wherein said rotation preventing means includes two axially extending guide plates secured to said valve seat and the sliding keys projected from said valve member or equivalent so as to be guided between said two guide plates.

10. The motor-operated valve according to claim 2 wherein said rotation preventing means includes a groove formed axially on the outside surface of the valve member or a member supporting the valve member, and a guide plate secured to the valve seat so as to be engageable with said groove.

11. The motor-operated valve according to claim 2 wherein said rotation preventing means, valve operating shaft and said valve member are arranged in a direction, and an inlet flange and an outlet flange of the tubular member are connected to outside pipes so that a fluid flows inside of said tubular member in said direction.

12. The motor operated valve according to claim 2 wherein said rotation preventing means, valve operating shaft and said valve member are arranged in a direction, a lid plate is secured to an end of said tubular member, and said valve seat is provided in a straight tube connected with said tubular member at a predetermined angle.

13. The motor-operated valve according to claim 2 wherein a bracket provided on a side of said tubular member near the valve member is formed into air-tight or liquid-tight, and means for sealing said valve operating shaft in an air-tight or liquid-tight manner is provided on said bracket.

14. The motor-operated valve according to claim 2 wherein said rotation preventing means, valve operating shaft and said valve member are arranged in one direction, a lid plate is secured to an end of said tubular member, and said valve seat is provided in a bending portion of a valve bent in a direction forming a predetermined angle against said arranged direction.

15. The motor-operated valve according to claim 2 wherein said valve is opened when said valve member is moved toward the rotor.

16. The motor-operated valve according to claim 2 wherein said valve is opened when said valve member is moved away from the rotor.

17. The motor-operated valve according to claim 1 wherein said valve operating shaft extending axially is secured in a fixed manner to said boss of the rotor, while a screw thread is formed on the surface of an end portion of said valve operating shaft, and a female screw thread meshing with said screw thread is formed internally of said valve member.

* * * * *